(12) United States Patent
Shah

(10) Patent No.: US 7,657,643 B2
(45) Date of Patent: *Feb. 2, 2010

(54) SYSTEM AND METHOD FOR DETERMINING A PREFERRED MIRRORED SERVICE IN A NETWORK BY EVALUATING A BORDER GATEWAY PROTOCOL

(75) Inventor: Dhaval N. Shah, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 187 days.

This patent is subject to a terminal disclaimer.

(21) Appl. No.: 11/626,234

(22) Filed: Jan. 23, 2007

(65) Prior Publication Data

US 2007/0130355 A1    Jun. 7, 2007

Related U.S. Application Data

(63) Continuation of application No. 09/883,076, filed on Jun. 15, 2001, now Pat. No. 7,185,100.

(51) Int. Cl.
*G06F 15/177* (2006.01)
(52) U.S. Cl. .................. 709/230; 709/220; 709/239
(58) Field of Classification Search ............... 709/220, 709/230, 239
See application file for complete search history.

(56) References Cited

U.S. PATENT DOCUMENTS

| | | |
|---|---|---|
| 5,341,477 A | 8/1994 | Pitkin et al. |
| 5,450,394 A | 9/1995 | Gruber et al. |
| 5,477,531 A | 12/1995 | McKee et al. |
| 5,521,907 A | 5/1996 | Ennis, Jr. et al. |
| 5,812,528 A | 9/1998 | VanDervort |
| 5,870,557 A | 2/1999 | Bellovin et al. |
| 5,894,556 A | 4/1999 | Grimm et al. |
| 5,905,871 A | 5/1999 | Buskens et al. |
| 5,917,820 A | 6/1999 | Reknter |
| 5,918,017 A | 6/1999 | Attanasio et al. |
| 6,009,081 A | 12/1999 | Wheeler |
| 6,018,516 A | 1/2000 | Packer |
| 6,023,733 A | 2/2000 | Periasamy et al. |
| 6,031,846 A | 2/2000 | Gurusami et al. |
| 6,041,352 A | 3/2000 | Burkick et al. |
| 6,070,190 A | 5/2000 | Reps et al. |

(Continued)

OTHER PUBLICATIONS

Bolosky, William J. et al., "Distributed Schedule Management in the Tiger Video Fileserver", ACM Symposium, p. 212-223.

Halabi, Bassam, "Internet Routing Architectures (CISCO)", Macmillan Technical Pub., excerpt pp. 1-3.

Kosiur, Dave, IP Multicasting: The Complete Guide to Interactive Corporate Networks, Wiley Computer Pub., excerpt pp. 1-3.

Liu, Zhao et al., "A Scalable Wireless Virtual LAN", ACM 2nd Annual International Conference on Mobile Computing, pp. 176-186.

(Continued)

*Primary Examiner*—Patrice Winder
(74) *Attorney, Agent, or Firm*—Baker Botts L.L.P.

(57) ABSTRACT

An embodiment of the present invention is a system and method for selecting a mirrored service in a network, such as the Internet, by utilizing a Border Gateway Protocol (BGP) attribute. According to an embodiment of the present invention, the BGP attribute, which may be stored in a border router, is accessed for each mirrored service for a prefix associated with the user requesting a host name. The attributes from each mirrored service are compared with each other to determine a "best" attribute which meets a predetermined criteria. The mirrored service associated with the best attribute is then selected as a resolution for the host name.

19 Claims, 7 Drawing Sheets

U.S. PATENT DOCUMENTS

| | | |
|---|---|---|
| 6,078,956 A | 6/2000 | Bryant et al. |
| 6,115,752 A | 9/2000 | Chauhan |
| 6,118,765 A | 9/2000 | Phillips |
| 6,205,477 B1 | 3/2001 | Johnson et al. ............. 709/220 |
| 6,260,070 B1 | 7/2001 | Shah ........................... 709/230 |
| 6,292,832 B1 | 9/2001 | Shah et al. .................. 709/226 |
| 6,298,381 B1 | 10/2001 | Shah et al. .................. 709/228 |
| 6,426,955 B1 | 7/2002 | Dalton et al. ............... 370/401 |
| 6,567,380 B1 | 5/2003 | Chen .......................... 370/238 |

OTHER PUBLICATIONS

Shnier, Mitchell, "Scott Mueller Library—Computer Dictionary" Que, Macmillan Computer Pub., except pp. 1-3.

Smith, Bradley R. et al., "Securing the Boder Gateway Routing Protocol", IEEE GlobeCom., pp. 81-85.

"Cisco Distributed Director", 1996, Cisco Systems, Inc.

Chapter 2.2 PING of TCP RFC 1739 available at www.ietf.org or ftp://ftp/isi,edu/in-notes/rfc1739.txt.

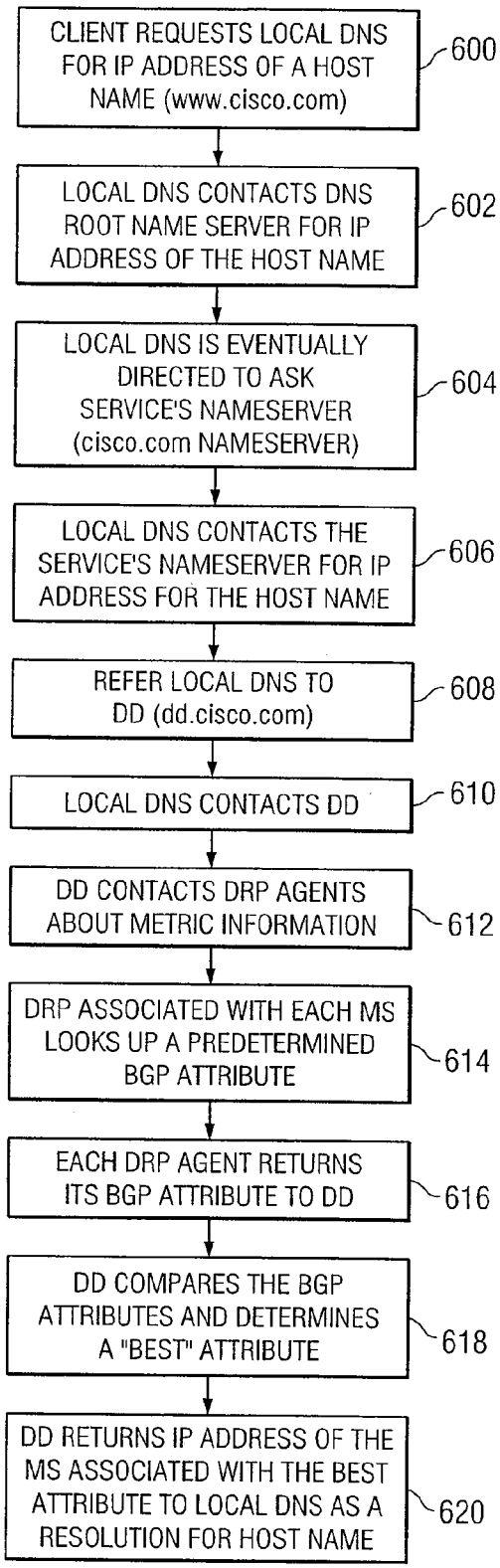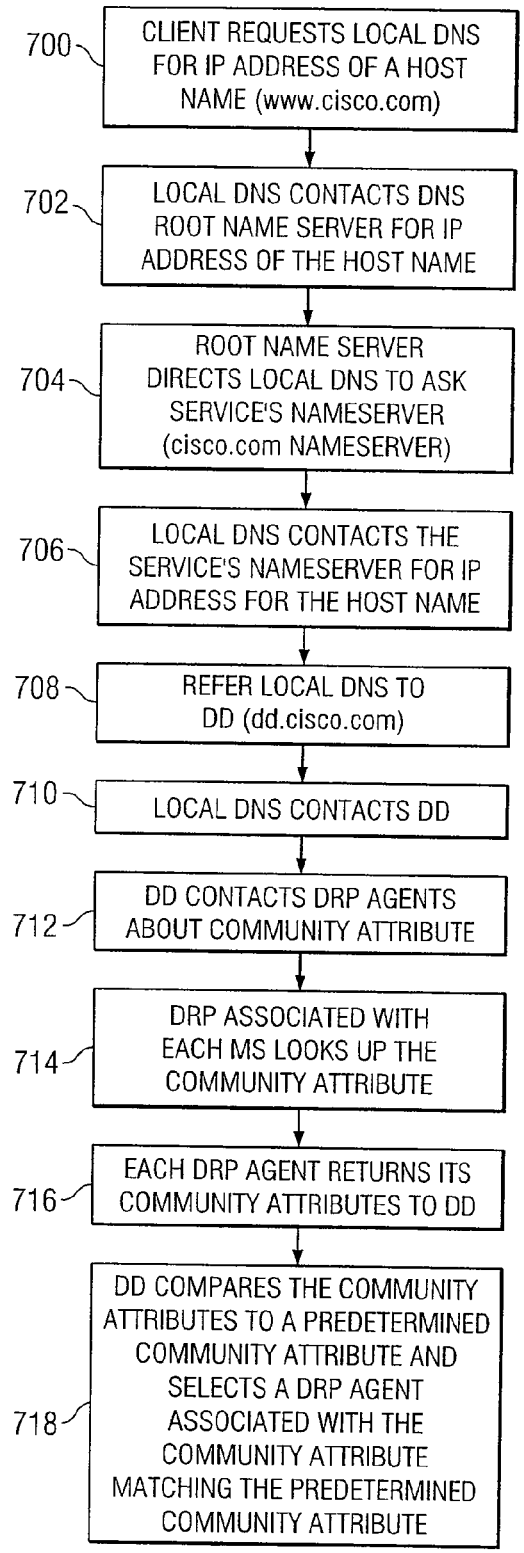
FIG. 8                    FIG. 9

SYSTEM AND METHOD FOR DETERMINING A PREFERRED MIRRORED SERVICE IN A NETWORK BY EVALUATING A BORDER GATEWAY PROTOCOL

CROSS-REFERENCE TO RELATED APPLICATIONS

This application is a continuation of U.S. application Ser. No. 09/883,076, filed Jun. 15, 2001, by Dhaval Shah and entitled "System and Method for Determining a Preferred Mirrored Service in a Network by Evaluating a Border Gateway Protocol," now issued as U.S. Pat. No. 7,185,100.

FIELD OF THE INVENTION

The present invention relates to accessing data in a network environment, such as the Internet, via a computer system. In particular, the present invention relates to a system and method for selecting a server for requested data by selecting an associated best Border Gateway Protocol attribute which meets a predetermined criteria.

BACKGROUND OF THE INVENTION

With the growing popularity of the Internet, providing speedy access to a requested location on the Internet is fast becoming a significant issue. For example, when a popular web page is hosted by a single computer, the Internet traffic to that computer can be overwhelming. To manage this problem, several computers can be utilized to host the same web page such that each hosting computer, typically referred to as a server, maintains a copy of the web page. If there are many servers at the same location, then the network connection to that location can become choked during a time of high Internet traffic. To avoid choking the network connection, mirrored servers are often located at different sites. These sites are herein referred to as mirrored sites. The use of multiple computers to host a network service, such as a web page, is typically referred to as mirrored services.

FIG. 1 is a block diagram illustrating a path taken by a client's request for a particular address. A client may be any entity which attempts to access a service. For example, the client may be a user, company, or an automated computer system. FIG. 1 shows a client 10 requesting an address for a network site, such as www.cisco.com, from a local domain name server 12. The client's local domain name server 12 may be a service such as Netcom or AT&T. The local domain name server 12 then eventually learns the address of one of the mirrored services 14A-14B, and replies to the client 10 with the address of one of the mirrored services 14A-14B.

FIG. 2 illustrates a basic organization of the Internet. The Internet includes groups of networks and routers which combine to create an autonomous system (AS) 50A-50E. A client may be located in one AS, such as AS50A, while the service which the client is attempting to access may be located in another AS, such as AS50E. In order to reach service 14, the request from client 10 may be passed from AS50A to AS50B through AS50C, through AS50D, and finally reaching service 14 at AS50E.

In a mirrored service environment, the client 10 may be in one AS, such as AS50A, while the mirrored services may be located in various different autonomous systems, such as AS50E and AS50C. An address of one of these mirrored services is typically needed in response to the client's request.

There are several conventional ways of determining which mirrored service should be assigned to a requesting client. A selection of a mirrored service can be based on several factors. Ideally, the requested address should be returned to the client very quickly and download into the client's computer system as quickly as possible. The time between the request being sent out by the client and the address being received is referred to as latency. The time it takes to download the requested data is typically determined by the band width.

One conventional service assignment scheme is a round robin scheme. The round robin simply takes turns on which mirrored service is to be used. A potential problem with the round robin scheme is that it does not take into consideration the various loads of the mirrored services at any given time. Additionally, the round robin scheme also fails to take into consideration the location of the user. Accordingly, the two factors of latency and band width are not typically considered in the round robin scheme.

When the service is a mirrored service, the mirrored services may be located in different autonomous systems. Some service selection methods attempt to measure the metric between the client 10 and each of the services 14. Metric is used herein to include a measurement of a unit which indicates distance or time or both. For example, one such method measures "hop count", wherein the number of autonomous systems located between client 10 and service 14 are counted. The mirrored service with the smallest hop count may be considered the best selection for that particular client.

Although the metric measurement methods are effective in many situations, there may be situations in which it is an advantage to have an alternate method for determining which mirrored service is best for a particular client. For example, one such situation is if the hop count between a client and a first server is the same as the hop count between the client and a second server. Although the hop count may be the same, the actual distances between the client and the first service and the client and the second service may be different. Another example of when an alternative method would be beneficial, is when an autonomous system is so large as to encompass more than one mirrored service. A client within that same autonomous system would not be able to use the hop count in order to determine which mirrored service is better for that client.

It would be desirable to have an alternative reliable method to determine which mirrored service is the best selection for a given client. The present invention addresses such a need.

SUMMARY OF THE INVENTION

An embodiment of the present invention is a system and method for selecting a mirrored service in a network, such as the Internet, by utilizing a Border Gateway Protocol (BGP) attribute. According to an embodiment of the present invention, the BGP attribute, which may be stored in a border router, is accessed for each mirrored service for a prefix associated with the user requesting a host name. The attributes from each mirrored service are compared with each other to determine a "best" attribute which meets a predetermined criteria. The mirrored service associated with the best attribute is then selected as a resolution for the host name.

A BGP attribute is meant herein to include supplemental information for the prefix associated with the user which is stored in a table in a border router. Examples of BGP attributes which may be used in accordance with embodiments of the present invention include multi-exit discriminator (MED), community attribute, and local preference.

A method according to an embodiment of the present invention for selecting a mirrored service in a network environment is presented. The method comprising steps of providing a first border gateway protocol attribute and providing a second border gateway protocol attribute. The first border gateway protocol attribute is compared with the second border gateway protocol attribute. One of the first border gateway protocol attribute and the second border gateway protocol attribute is selected, resulting in a selected attribute, wherein the selected attribute meets a predetermined criteria. A mirrored service associated with the selected attribute is then selected.

In another aspect of the invention, a system according to an embodiment of the present invention for selecting a mirrored service in a network environment is also presented. The system includes a first protocol agent configured to provide a first border gateway protocol attribute and a second protocol agent configured to provide a second border gateway protocol attribute. A distributed director is coupled with the first and second protocol agents to compare the first border gateway protocol attribute with the second border gateway protocol attribute, resulting in a selected attribute, wherein the selected attribute meets a predetermined criteria, and wherein a mirrored service associated with the selected attribute is selected.

BRIEF DESCRIPTION OF THE DRAWINGS

FIG. 8 is another flow diagram of a method according to an embodiment of the present invention for selecting a mirrored service.

FIG. 9 is a flow diagram of a method according to an embodiment of the present invention for selecting a mirrored service by utilizing BGP community attributes.

DETAILED DESCRIPTION OF THE PREFERRED EMBODIMENTS

The following description is presented to enable one of ordinary skill in the art to make and to use the invention and is provided in the context of a patent application and its requirements. Various modifications to the preferred embodiments will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
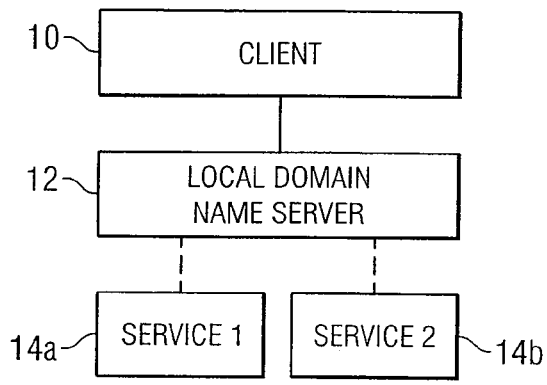
FIG. 1 is a block diagram illustrating a path taken by a user's request for a particular address.
Figure 2:
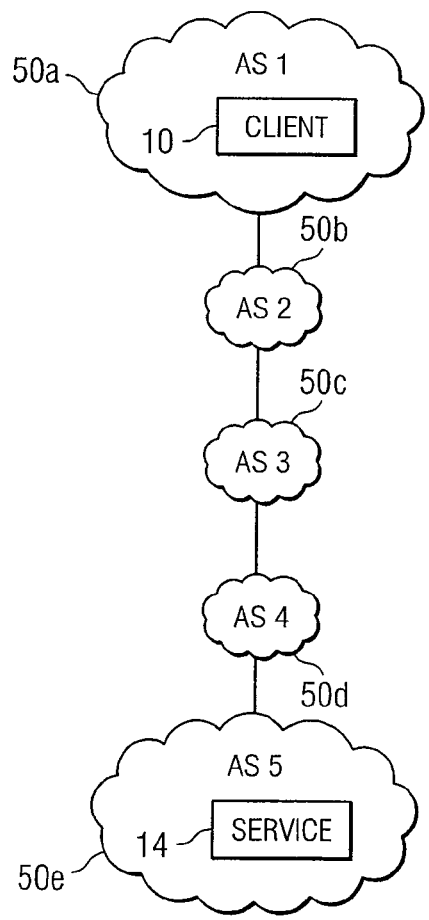
FIG. 2 is an illustration of a basic organization of the Internet.
Figure 3:
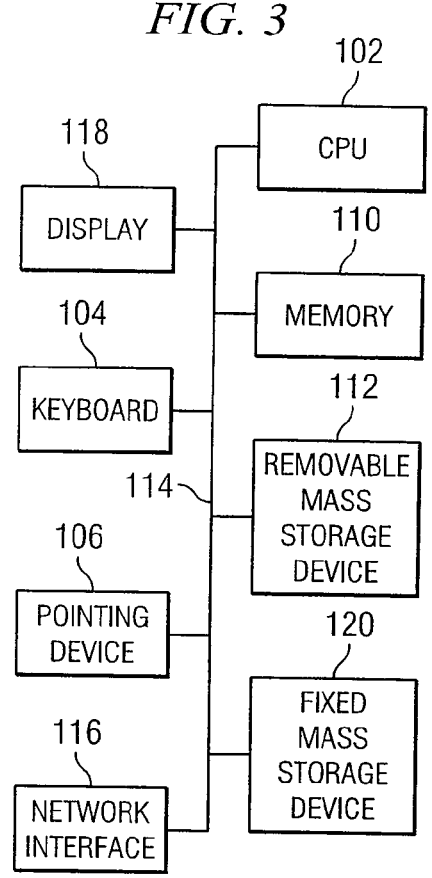
FIG. 3 is a block diagram of a computer system suitable for implementing the present invention.

FIG. 3 is a block diagram of a general purpose computer system 100 suitable for carrying out the processing in accordance with one embodiment of the present invention. FIG. 3 illustrates one embodiment of a general purpose computer system. Other computer system architectures and configurations can be used for carrying out the processing of the present invention. Computer system 100, made up of various subsystems described below, includes at least one microprocessor subsystem (also referred to as a central processing unit, or CPU) 102. That is, CPU 102 can be implemented by a single-chip processor or by multiple processors. CPU 102 is a general purpose digital processor which controls the operation of the computer system 100. Using instructions retrieved from memory 110, the CPU 102 controls the reception and manipulation of input data, and the output and display of data on output devices.

CPU 102 is coupled bi-directionally with memory 110 which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. It can also store programming instructions and data, in the form of data objects and text objects, in addition to other data and instructions for processes operating on CPU 102. Also as well known in the art, primary storage typically includes basic operating instructions, program code, data and objects used by the CPU 102 to perform its functions. Primary storage devices 110 may include any suitable computer-readable storage media, described below, depending on whether, for example, data access needs to be bi-directional or uni-directional. CPU 102 can also directly and very rapidly retrieve and store frequently needed data in a cache memory (not shown).

A removable mass storage device 112 provides additional data storage capacity for the computer system 100, and is coupled either bi-directionally or uni-directionally to CPU 102. For example, a specific removable mass storage device commonly known as a CD-ROM typically passes data uni-directionally to the CPU 102, whereas a floppy disk can pass data bi-directionally to the CPU 102. Storage 112 may also include computer-readable media such as magnetic tape, flash memory, signals embodied on a carrier wave, PC-CARDS, portable mass storage devices, holographic storage devices, and other storage devices. A fixed mass storage 120 can also provide additional data storage capacity. The most common example of mass storage 120 is a hard disk drive. Mass storage 112, 120 generally store additional programming instructions, data, and the like that typically are not in active use by the CPU 102. It will be appreciated that the information retained within mass storage 112, 120 may be incorporated, if needed, in standard fashion as part of primary storage 110 (e.g. RAM) as virtual memory.

In addition to providing CPU 102 access to storage subsystems, bus 114 can be used to provide access to other subsystems and devices as well. In the described embodiment, these can include a display monitor 118, a network interface 116, a keyboard 104, and a pointing device 106, as well as an auxiliary input/output device interface, a sound card, speakers, and other subsystems as needed. The pointing device 106 may be a mouse, stylus, track ball, or tablet, and is useful for interacting with a graphical user interface.

The network interface 116 allows CPU 102 to be coupled to another computer, computer network, or telecommunications network using a network connection as shown. Through the network interface 116, it is contemplated that the CPU 102 might receive information, e.g., data objects or program instructions, from another network, or might output information to another network in the course of performing the above-described method steps. Information, often represented as a sequence of instructions to be executed on a CPU, may be received from and outputted to another network, for example, in the form of a computer data signal embodied in a carrier wave. An interface card or similar device and appropriate software implemented by CPU 102 can be used to connect the computer system 100 to an external network and transfer data according to standard protocols. That is, method embodiments of the present invention may execute solely upon CPU 102, or may be performed across a network such as the Internet, intranet networks, or local area networks, in conjunction with a remote CPU that shares a portion of the processing. Additional mass storage devices (not shown) may also be connected to CPU 102 through network interface 116.

An auxiliary I/O device interface (not shown) can be used in conjunction with computer system 100. The auxiliary I/O device interface can include general and customized interfaces that allow the CPU 102 to send and, more typically, receive data from other devices such as microphones, touch-sensitive displays, transducer card readers, tape readers, voice or handwriting recognizers, biometrics readers, cameras, portable mass storage devices, and other computers.

In addition, embodiments of the present invention further relate to computer storage products with a computer readable medium that contain program code for performing various computer-implemented operations. The computer-readable medium is any data storage device that can store data which can thereafter be read by a computer system. The media and program code may be those specially designed and constructed for the purposes of the present invention, or they may be of the kind well known to those of ordinary skill in the computer software arts. Examples of computer-readable media include, but are not limited to, all the media mentioned above: magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices. The computer-readable medium can also be distributed as a data signal embodied in a carrier wave over a network of coupled computer systems so that the computer-readable code is stored and executed in a distributed fashion. Examples of program code include both machine code, as produced, for example, by a compiler, or files containing higher level code that may be executed using an interpreter.

The computer system shown in FIG. 3 is but an example of a computer system suitable for use with the invention. Other computer systems suitable for use with the invention may include additional or fewer subsystems. In addition, bus 114 is illustrative of any interconnection scheme serving to link the subsystems. Other computer architectures having different configurations of subsystems may also be utilized.

Figure 4:
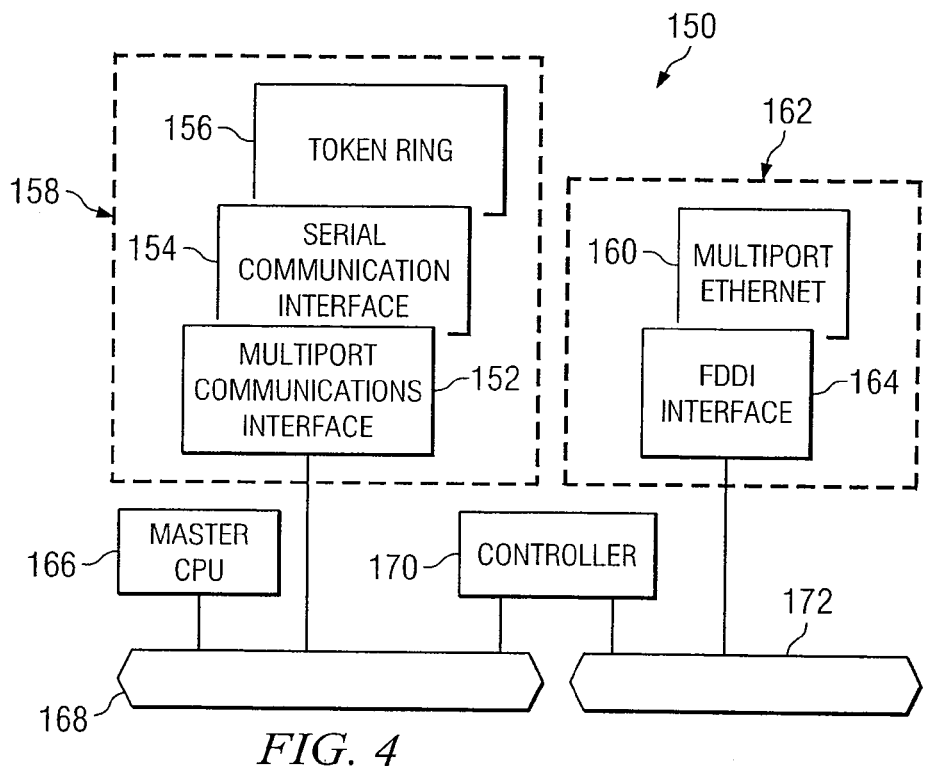
FIG. 4 is a block diagram of a router suitable for implementing the present invention.

FIG. 4 is a block diagram of an example of a router 150 suitable for implementing an embodiment of the present invention. The router 150 is shown to include a master central processing unit (CPU) 166, low and medium speed interfaces 158, and high speed interfaces 162. In preferred embodiments, the CPU 166, is responsible for such router tasks as routing table computations and network management. It may include one or more microprocessor chips selected from complex instruction set computer (CISC) chips (such as the Motorola 68040 Microprocessor), reduced instructions set computer (RISC) chips, or other available chips. In a preferred embodiment, non-volatile RAM and/or ROM also form part of CPU 166. However, there are many different ways in which memory can be coupled to the system.

The interfaces 158 and 162 are typically provided as interface cards. Generally, they control the sending and receipt of data packets over the network and sometimes support other peripherals used with the router 150. The low and medium interfaces 158 include a multiport communications interface 152, a serial communications interface 154, and a token ring interface 156. The high speed interfaces 162 include an FDDI interface 164 and a multiport ethernet interface 160. Preferably, each of these interfaces (low/medium and high speed) includes (1) a plurality of ports appropriate for communication with the appropriate media, and (2) an independent processor such as the 2901 bit slice processor (available from Advanced Micro Devices Corporation of Santa Clara, Calif.), and in some instances (3) volatile RAM. The independent processors control such communication intensive tasks as packet switching and filtering, and media control and management. By providing separate processors for the communication intensive tasks, this architecture permits the master microprocessor 166 to efficiently perform routing computations, network diagnostics, security functions, etc.

The low and medium speed interfaces are coupled to the master CPU 166 through a data, control, and address bus 168. High speed interfaces 162 are connected to the bus 168 through a fast data, control, and address bus 172 which is intern connected to a bus controller 170. The bus controller functions are provided by a processor such as a 2901 bit slice processor.

Although the system shown in FIG. 4 is an example of a router suitable for implementing an embodiment of the present invention, it is by no means the only router architecture on which the present invention can be implemented. For example, an architecture having a single processor that handles communications as well as routing computations, etc. would also be acceptable. Further, other types of interfaces and media could also be used with the router.

Figure 5:
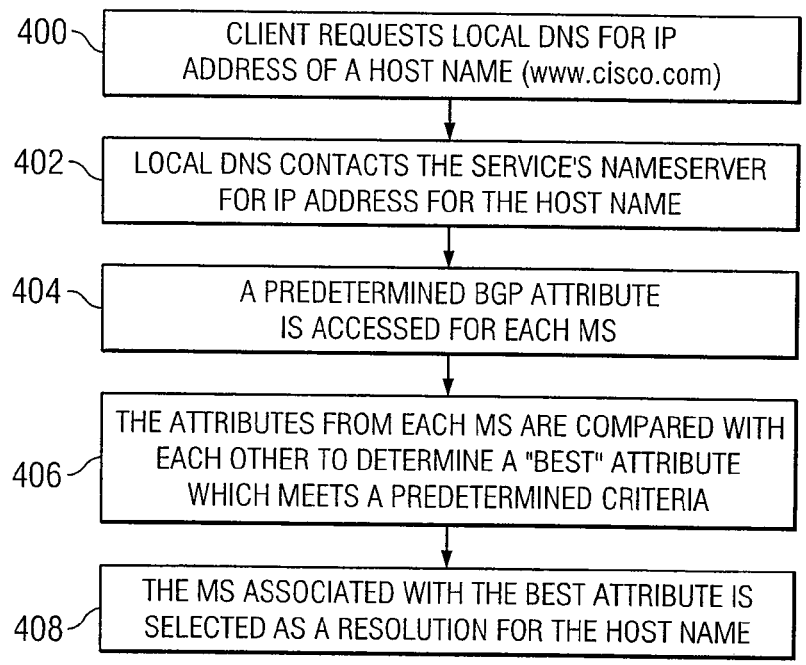
FIG. 5 is a flow diagram of a method according to an embodiment of the present invention for selecting a mirrored service.
Figure 6:
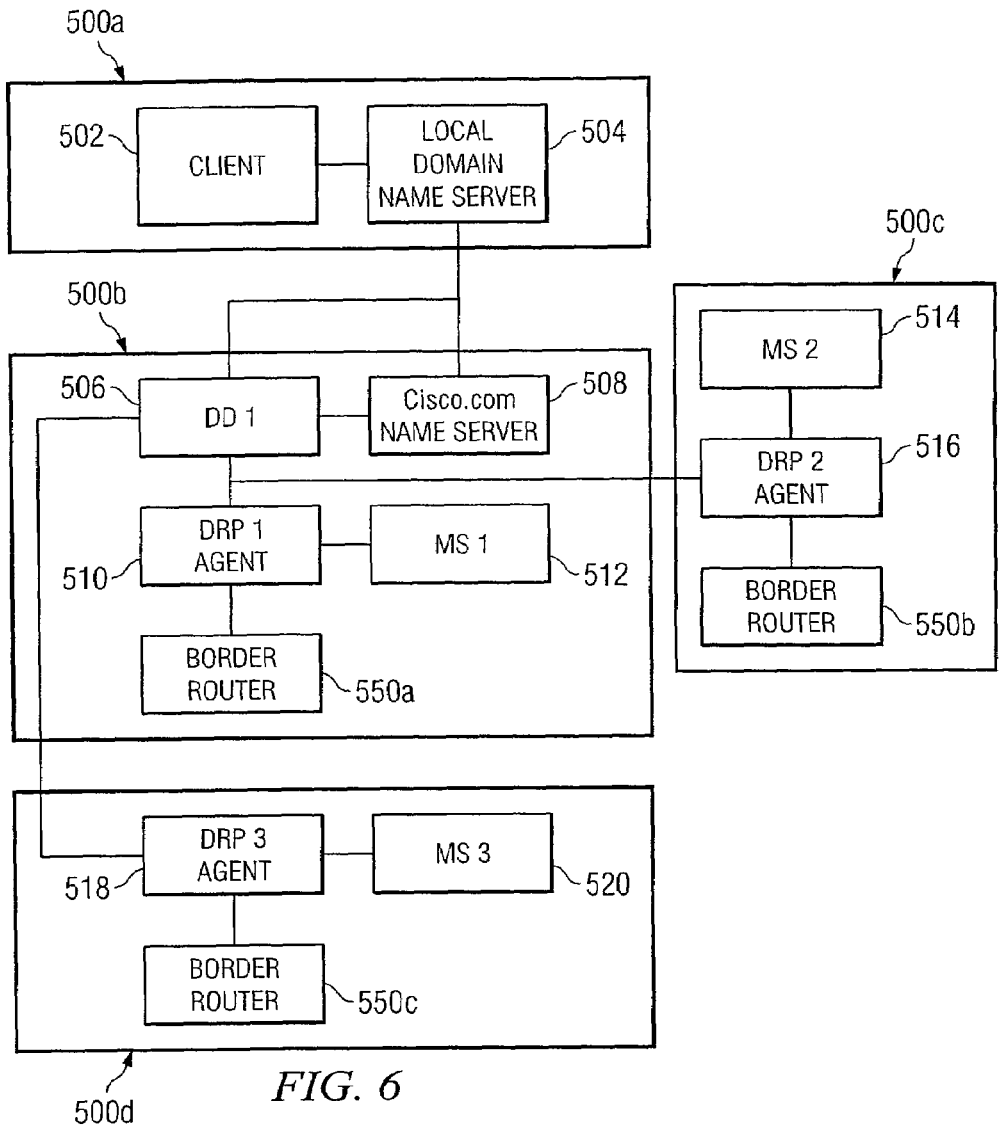
FIG. 6 is a block diagram of a multi-autonomous system according to an embodiment of the present invention for selecting a mirrored service.
Figure 7:
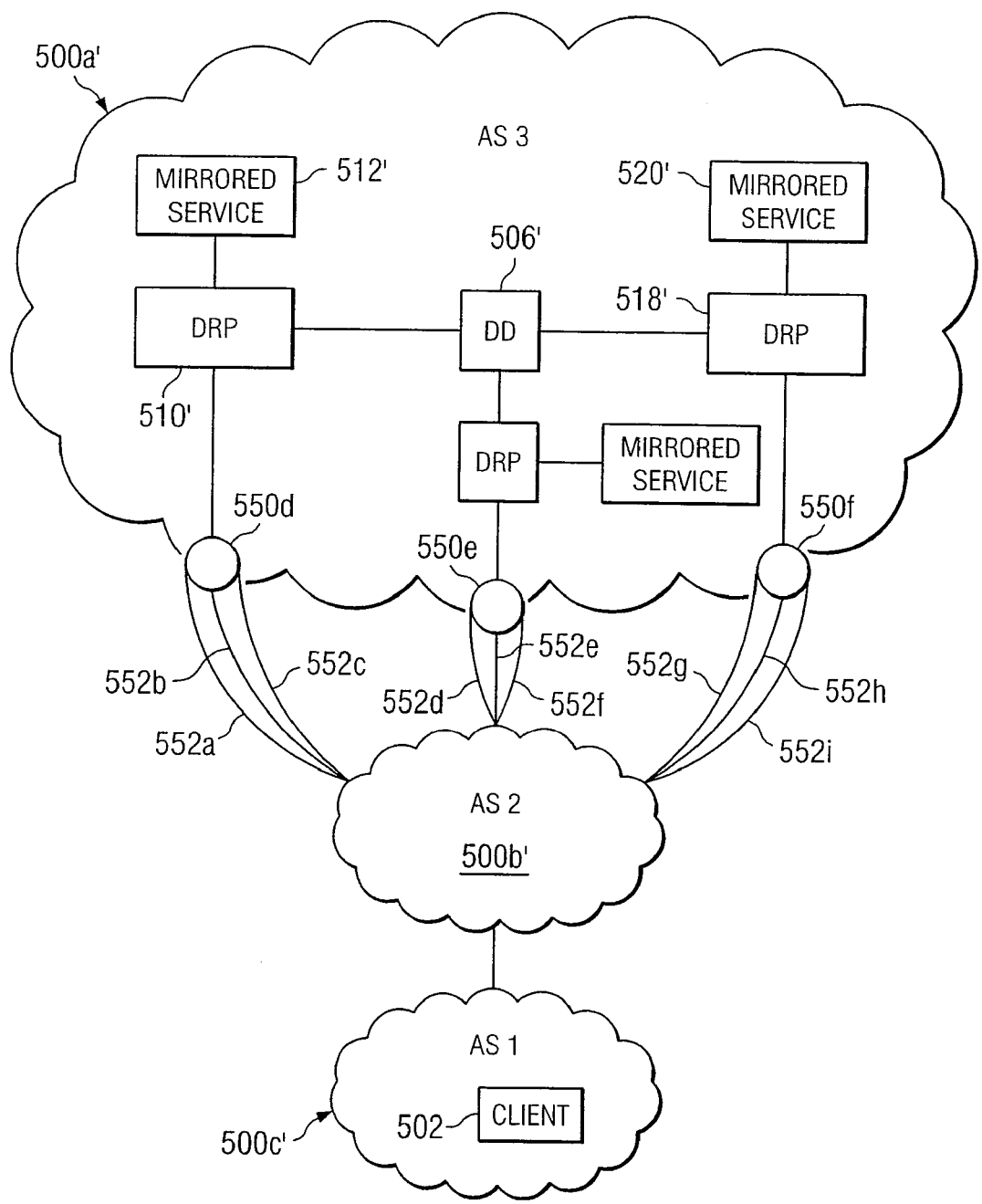
FIG. 7 is a block diagram of a system according to an embodiment of the present invention for selecting a mirrored service wherein multiple mirrored services are included in a single autonomous system.

FIG. 5 is a flow diagram of a method according to an embodiment of the present invention for selecting a mirrored service. The method shown in FIG. 5 may be applied to either a system with mirrored services located in multiple autonomous systems (an example of which is shown in FIG. 6) or a system with multiple mirrored services located in a single autonomous system (an example of which is shown in FIG. 7). According to the flow diagram of FIG. 5, a client requests a local domain name server (DNS) for an Internet Protocol (IP) address of a host name, via step 400. An example of a host name may be www.cisco.com. The local DNS may then contact the requested services name server for the requested IP address for the host name, via step 402. A predetermined Border Gateway Protocol (BGP) attribute is accessed for each mirrored service (MS), via step 404. Details of the BGP attribute will later be discussed in conjunction with the remaining figures.

The attributes from each mirrored service are compared with each other to determine a "best" attribute which meets a predetermined criteria, via step 406. The mirrored service associated with the best attribute is selected as a resolution for the host name, via step 408.

FIG. 6 is a block diagram of a multi-autonomous system according to an embodiment of the present invention for selecting a mirrored service. FIG. 6 shows autonomous systems 500A-500D. A client 502 is shown to be coupled to a local domain server 504 within autonomous system 500A. In this example, the client 502 requests the IP address of a host name, such as www.cisco.com. The client's request is sent to the local domain name server 504, which in turn eventually sends a request to the host name server 508.

In this example, the host name server is cisco.com name server. The host name server 508 may be located in a separate autonomous system, such as autonomous system 500B. The host name server 508 then interacts with a distributed director 506 and a director response protocol agent 510 in order to determine which mirrored service (MS) 512, 514, or 520, is the best selection to respond to the client's request. The distributed director 506 may be any device which is capable of transparently directing a client to the best mirrored service. Examples of such a distributed director is Distributed Director model #4700m, or Distributed Director model #2500m, both of which are manufactured by Cisco Systems, Inc. The director response protocol agent 510 may be any device which is capable of transparently measuring or calculating round trip times. Examples of such a device include Cisco 7500 Router, Cisco 7200 Router, Cisco 4700 Router, and Cisco 2500 Router, all of which are manufactured by Cisco Systems, Inc. "Transparent" is herein meant to indicate a process which is not seen by a user.

The distributed director 506 then sends a request to each DRP agent 510, 516, and 518 in the various autonomous systems 500B-500D in which the mirrored services 512, 514, and 520 are located. The distributed director 506 requests of each DRP agent 510, 518, 516, a predetermined Border Gateway Protocol (BGP) attribute for a prefix associated with the client.

The Border Gateway Protocol information is typically used by border routers 550a-550c for purposes of sharing information between autonomous systems. Border routers 550a-550b are routers designed to communicate between autonomous systems. By using the Border Gateway Protocol information, autonomous system A will have appropriate information to be able to communicate with autonomous system B.

Border routers 550a-550c may contain attributes for prefixes associated with various clients. A prefix indicates a set of IP addresses assigned to an autonomous system. For example, a unique address of a client may be 71.69.22.0, wherein the last numerical value may vary from 0 to 256. Although each user in an autonomous system may have a unique address, 257 of the users may have the same prefix. For each prefix, there may be a set of attributes associated with it. These attributes include supplemental information for each prefix. A BGP attribute is meant herein to include supplemental information for the prefix associated with the user which is stored in a table in a border router.

Each DRP agent 510, 516, 518, then looks up the requested Border Gateway Protocol (BGP) attribute from the nearest border router 550a-550c. Examples of BGP attributes include Multi Exit Discriminator (MED), community attribute, and local preference. Each DRP agent 510, 516, 518, then replies to the distributed director 506 with its own BGP attributes. The distributed director 506 can then compare the various attributes and determine the best mirrored service. An example of a best mirrored service is the mirrored service associated with the "best" BGP attribute. An example of a "best" BGP attribute is an attribute which meets a predetermined criteria. The distributed director 506 can then reply to the local domain name server 504 with an IP address for the selected mirrored service.

FIG. 7 is a block diagram of a system according to an embodiment of the present invention for selecting a mirrored service, wherein a single autonomous system is shown to include multiple mirrored services. FIG. 7 is shown to include autonomous systems 500A'-500C'. The client 502 is shown to be located in autonomous system 500C'. Autonomous system 500C' is shown to be coupled to autonomous system 500D', which in turn is shown to be coupled to autonomous system 500A'.

In 500A', several mirrored services 512', 514', and 520' are shown to be included in a single autonomous system 500A'. The mirrored services are shown to be coupled to DRP agents 510', 516', and 518', which in turn are coupled to a distributed director, 506'. Each of the DRP agents 510', 516', and 518', are shown to be coupled to a border router 550d-550f. Although an autonomous system normally includes multiple routers, a few are selected to be border routers 550d-550f. These border routers 550d-550f perform the function of facilitating communication outside of AS500A'.

In this example, the border routers 550d-550f are shown to be coupled to autonomous system 500B'. Each border router 550d-550f are coupled to AS500B' via connections 552A-552I. A multi-exit discriminator (MED) value dynamically indicates which link 552A-552C to use between AS500B' and AS500A' by border router 550d to send data for a particular prefix. For example, client 502 of AS500C' will have a prefix to its IP address. This particular prefix will have an associated MED value which indicates to border router 550d which link 552A-552C to use for the prefix of client 502. Likewise, a MED value associated with the prefix for client 502 will also indicate which link 552D-552F to use for border router 550e, and another MED value will indicate which link 552G-552I to use for border router 550f for a particular clients' prefix. Typically, the lower the MED value the more preferred a particular link is for use with a particular prefix.

FIG. 8 is another flow diagram of a method according to an embodiment of the present invention for selecting a mirrored service. The method shown in FIG. 8 may be applied to either the system shown in FIG. 6 or the system shown in FIG. 7. As previously discussed, the client requests the local domain name server for an IP address of a host name, such as www.cisco.com, via step 600. The local domain name server then contacts a domain name server root name server for an IP address of the host name, via step 602. It is common for local domain name servers to contact a root name server for further direction. Root name servers and their uses are well known in the art.

The local domain name server is eventually directed to ask the requested services name server, such as cisco.com name sever, via step 604. The local domain name server then contacts the service's name server for an IP address of the host name, via step 606. The local domain name server is then referred to the distributed director, for example to dd.cisco.com, via step 608. The local domain name server then contacts the distributed director, via step 610. The distributed director then contacts the distributed response protocol (DRP) agents, located near the various mirrored servers, regarding metric information, via step 612. Metric information can include distance information as well as time information.

Each DRP agent associated with each mirrored service looks up a predetermined Border Gateway Protocol (BGP) attribute associated with a prefix of the client, via step 614.

Each DRP agent then returns its BGP attribute to the distributed director, via step 616. The distributed director then compares the BGP attributes associated with the clients prefix and determines a "best" attribute, via step 618. As previously stated, the "best" attribute may be an attribute which meets a predetermined criteria. The distributed director then returns the IP address of the mirrored service associated with the best attribute to the local DNS as a resolution for the host name, via step 620.

FIG. 9 is a flow diagram of an example of the method according to an embodiment of the present invention for selecting a mirrored service. This example may be applied to either the system shown in FIG. 6 or the system shown in FIG. 7. In this example, the method utilizes a community attribute associated with the client's prefix. A community attribute is a string which is stored for each prefix which indicates some uniqueness for the prefix.

As before, the client requests a local DNS for an IP address of a host name, such as www.cisco.com, via step 700. The local DNS contacts the DNS root name server for an IP address of the host name, via step 702. The root name server directs the local DNS to ask the service's name server, such as cisco.com name server, via step 704. The local DNS then contacts the services name server for an IP address for the host name, via step 706.

The local DNS is the referred to the distributed director, such as dd.cisco.com, via step 708. The local DNS then contacts the distributed director, via step 710. The distributed director then contacts the DRP agents about a community attribute associated with the prefix of the client, via step 712. DRP agents associated with each mirrored service looks up its community attribute associated with the clients prefix, via step 714. Each DRP agent then returns its community attributes to the distributed director, via step 716. The distributed director compares the community attributes to a predetermined community attribute and selects a DRP agent associated with the community attribute matching the predetermined community attribute, via step 718. The predetermined community attribute may be selected in various ways. One such way is for the community attribute to be selected by a user, such as a network administrator.

Figure 10:
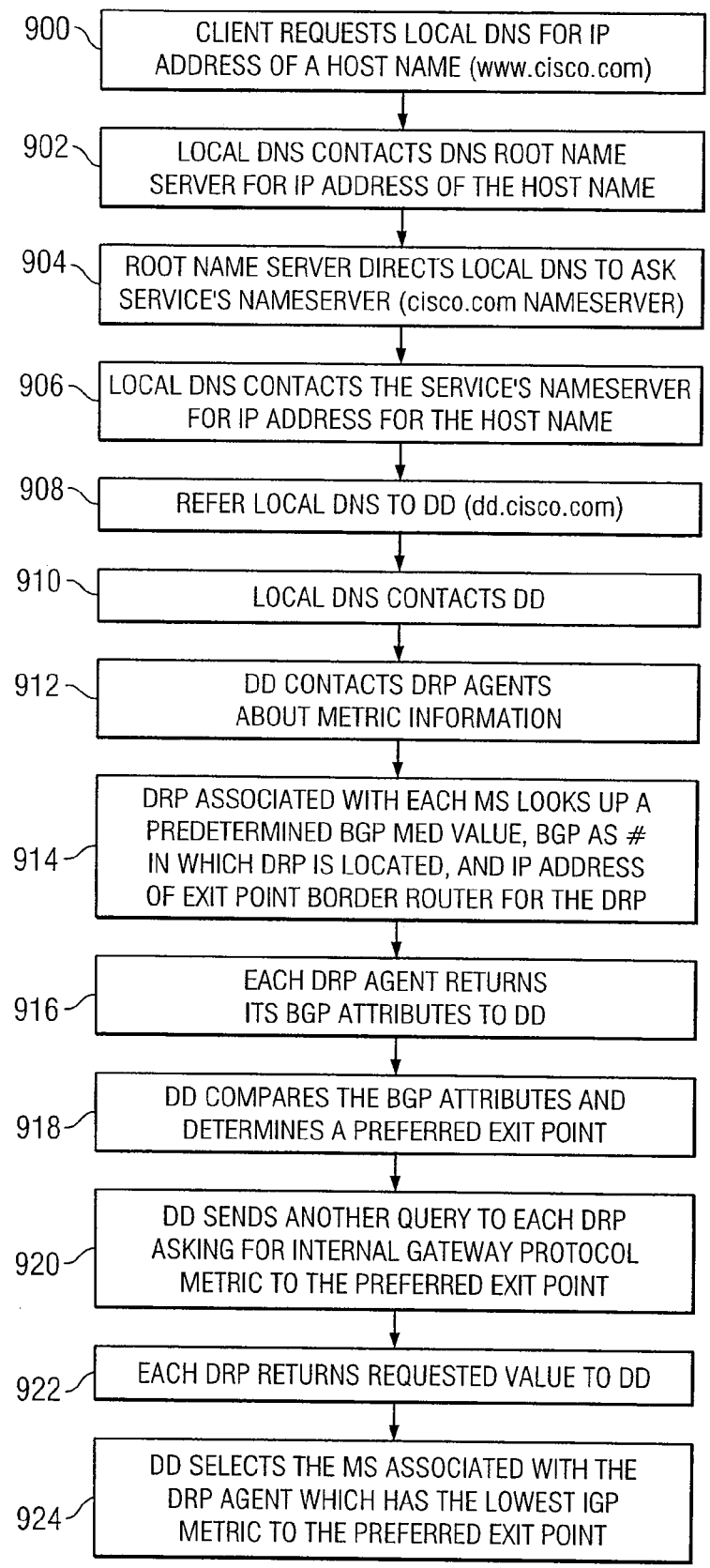
FIG. 10 is a flow diagram of a method according to an embodiment of the present invention for selecting a mirrored service by utilizing BGP MED values.

FIG. 10 is a flow diagram of another example of the method according to an embodiment of the present invention for selecting a mirrored service. This example is preferably used in conjunction with the system of multiple mirrored services included in a single autonomous system, such as the system shown in FIG. 7. In this example, a mirrored service is selected by utilizing a BGP MED value. A client requests a local DNS or IP address of a host name, such as www.cisco. com, via step 900. The local DNS then contacts the DNS root name server for an IP address of the host name, via step 902. The local DNS is eventually directed to ask the service's name server, such as cisco.com name server, via step 904.

The local DNS contacts the services name server for IP address for the host name, via step 906. The local DNS is then referred to a distributed director, such as dd.cisco.com, via step 908. The local DNS then contacts the distributed director, via step 910. The distributed director then contacts its DRP agents about metric information, via step 912.

The DRP agents associated with each mirrored service looks up a predetermined BGP MED value associated with a prefix of the client, a BGP autonomous system number in which the DRP agent is located, and an IP address of a border router for the DRP, via step 914. Each DRP agent then returns its BGP attributes to the distributed director, via step 916.

The distributed director compares the BGP attributes, selects a BGP MED which meets a predetermined criteria, such as the lowest BGP MED, and determines a preferred exit point, via step 918. An exit point refers to a border router. The distributed director then sends another query to each DRP agent asking for internal gateway protocol metric to the preferred exit point, via step 920. For example, as shown in FIG. 7, if the border router 550ƒ is selected as the preferred exit point, then each DRP agent 510', 516' and 518' would look up its internal gateway protocol metric to the border router 550ƒ. The internal gateway protocol metric maybe the distance between the DRP agent 510', 516', 518', and the preferred border router 550ƒ. Alternatively, the internal gateway protocol metric may be a measure of time for a packet sent from a DRP agent 510', 516', 518' to reach the preferred border router 550ƒ. The internal gateway protocol metric may be stored in table located in a border router.

Each DRP agent then returns the requested value to the distributed director, via step 922. The distributed director then selects the mirrored service associated with the DRP agent which has the lowest internal gateway protocol metric to the preferred border router, via step 924.

Figure 11:
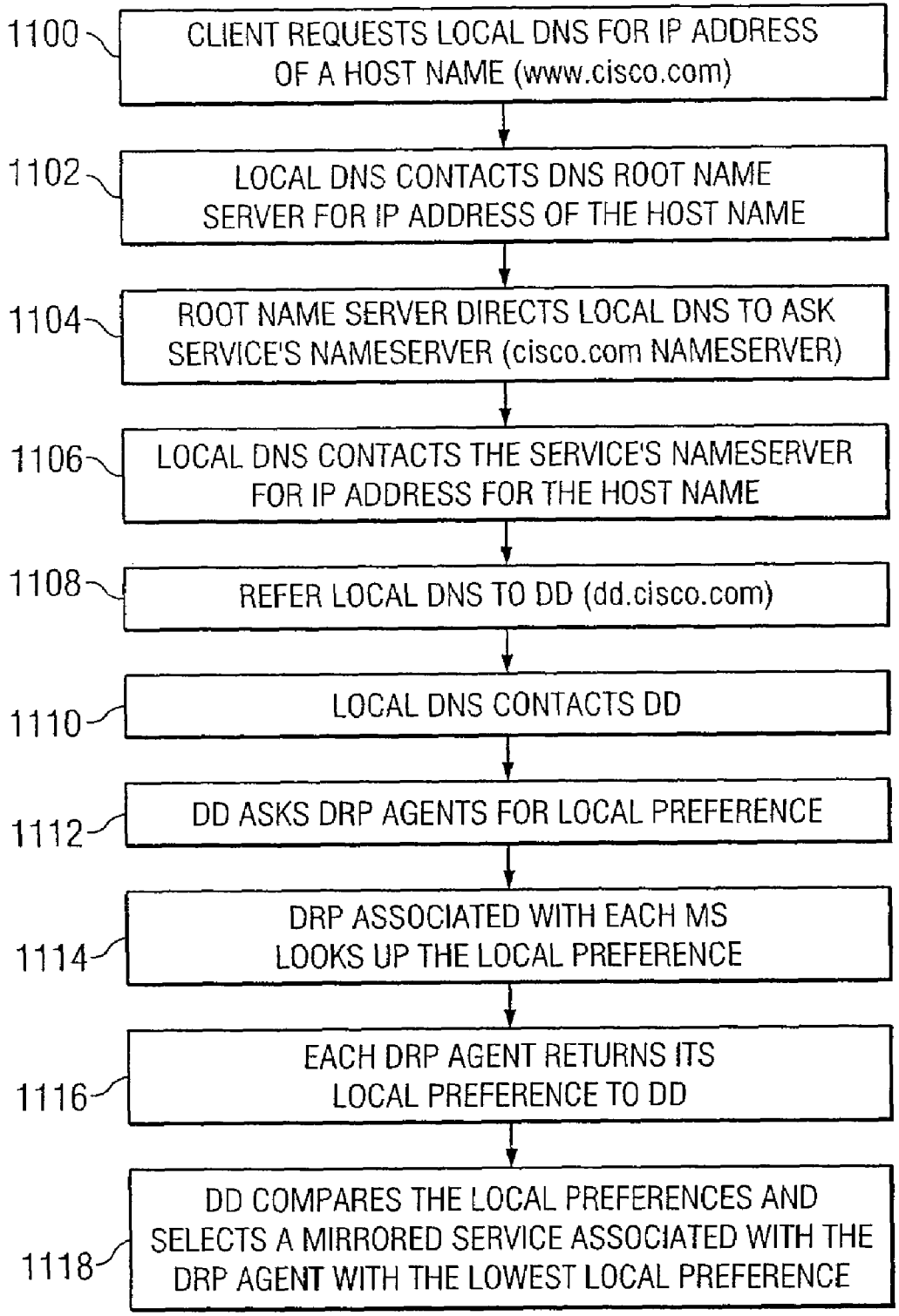
FIG. 11 is a flow diagram of a method according to an embodiment of the present invention for selecting mirrored services by utilizing BGP local preferences.

FIG. 11 is a flow diagram of yet another example of the method according to an embodiment of the present invention. This example is preferably used in conjunction with a system which includes multiple mirrored services within a single autonomous system, such as the system shown in FIG. 7. In this example, a mirrored service is selected by utilizing a local preference associated with the client's prefix.

A BGP local preference is a value configured on BGP border routers. Since there are typically multiple border routers in a single autonomous system, the BGP local preference indicates which border router is preferred to be used to communicate with a client with a particular prefix.

As in the other examples, a client requests the local DNS for IP address of a host name, such as www.cisco.com, via step 1100. The local DNS then contacts its DNS root name server for the IP address of the host name, via step 1102. The local DNS is then eventually directed to ask the service's name server, such as cisco.com name server, via step 1104. The local DNS then contacts the service's name server for an IP address for the host name, via step 1106.

The local DNS is then referred to the distributed director, such as dd.cisco.com, via step 1108. The local DNS then contacts the distributed director, via step 1110. The distributed director then asks the DRP agents for its local preference associated with the clients prefix, via step 1112. The DRP associated with each mirrored service then looks up the local preference associated with the clients prefix, via step 1114. Each DRP agent then returns its local preference to the distributed director, via step 1116. The distributed director then compares the local preferences and selects mirrored server associated with the DRP agent with a local preference which meets a predetermined criteria, such as the lowest local preference, via step 1118.

A method and system for selecting a mirrored service has been disclosed. Software written according to the present invention may be stored in some form of computer-readable medium, such as memory or CD-ROM, or transmitted over a network, and executed by a processor.

Although the present invention has been described in accordance with the embodiment shown, one of ordinary skill in the art will readily recognize that there could be variations to the embodiment and these variations would be within the spirit and scope of the present invention. Accordingly, many modifications may be made by one of ordinary skill in the art without departing from the spirit and scope of the appended claims.

What is claimed is:

1. An apparatus for selecting a mirrored service in a network environment, the system comprising:

a distributed director coupled to first and second director response protocol agents and operable to compare a first border gateway protocol attribute with a second border gateway protocol attribute, resulting in a selected attribute, wherein the selected attribute meets a predetermined criteria, and wherein a mirrored service associated with the selected attribute is selected;
wherein the agents are coupled to first and second and border routers and are configured to receive the first border gateway protocol attribute related to a first mirrored service from the first border router and the second border gateway protocol attribute related to a second mirrored service from the second border router, the first mirrored service and the second mirrored service being in an autonomous system.

2. The apparatus of claim 1, wherein the first border gateway protocol attribute is a first multi-exit discriminator (MED).

3. The apparatus of claim 1, wherein the second border gateway protocol attribute is a second multi-exit discriminator.

4. The apparatus of claim 1, wherein the distributed director contacts the first director response protocol agent about metric information.

5. The apparatus of claim 1, wherein the first director response protocol agent references a predetermined border gateway protocol attribute in responding to the distributed director.

6. The apparatus of claim 1, wherein the first director response protocol agent returns its respective border gateway protocol attribute to the distributed director.

7. The apparatus of claim 1, wherein the distributed director compares border gateway protocol attributes in order to determine a best attribute for purposes of selecting a mirrored service.

8. The apparatus of claim 1, wherein the distributed director contacts the first director response protocol agent for a community attribute.

9. The apparatus of claim 1, wherein the first director response protocol agent returns its respective community attribute to the distributed director.

10. The apparatus of claim 9, wherein the distributed director compares a plurality of community attributes to a predetermined community attribute and selects a director response protocol agent associated with the community attribute that matches the predetermined community attribute.

11. The apparatus of claim 1, wherein the distributed director compares a plurality of border gateway protocol attributes to determine a preferred exit point.

12. The apparatus of claim 11, wherein the distributed director selects the mirrored service associated with the director response protocol agent that has the lowest IGP metric to the preferred exit point.

13. The apparatus of claim 1, wherein the distributed director solicits the first director response protocol agent for local preference data.

14. The apparatus of claim 13, wherein the distributed director selects the mirrored service associated with the director response protocol agent that has the lowest local preference.

15. The apparatus of claim 1, wherein the distributed director is operable to interface with a local domain name server.

16. A method for selecting a mirrored service in a network environment, the method comprising:
comparing, by a computer system, a first border gateway protocol attribute with a second border gateway protocol attribute;
generating, by the computer system, a selected attribute based on the first and second attributes, wherein the selected attribute meets a predetermined criteria; and
selecting, by the computer system, a mirrored service associated with the selected attribute.

17. The method of claim 16, further comprising:
receiving the first attribute related to a first mirrored service from the first border router and the second attribute related to a second mirrored service from the second border router.

18. The method of claim 16, further comprising:
soliciting the agents for local preference data; and
selecting a mirrored service associated with a director response protocol agent that has the lowest local preference.

19. The method of claim 16, further comprising:
resolving a domain name after contacting a local domain name server.

* * * * *

UNITED STATES PATENT AND TRADEMARK OFFICE
CERTIFICATE OF CORRECTION

PATENT NO.       : 7,657,643 B2                                         Page 1 of 1
APPLICATION NO. : 11/626234
DATED            : February 2, 2010
INVENTOR(S)      : Dhaval N. Shah It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 197 days.

Signed and Sealed this

Thirtieth Day of November, 2010

David J. Kappos
*Director of the United States Patent and Trademark Office*